United States Patent
Davis et al.

(10) Patent No.: US 11,198,107 B2
(45) Date of Patent: Dec. 14, 2021

(54) CONDUIT CONTACTOR AND METHOD OF USING THE SAME

(71) Applicant: VISIONARY FIBER TECHNOLOGIES, INC., Lockhart, TX (US)

(72) Inventors: Scott Kevin Davis, Smithville, TX (US); Matthew Moore, Austin, TX (US); Kei Fuchigami, Buda, TX (US); William Lanier, West Jordan, UT (US)

(73) Assignee: Visionary Fiber Technologies, Inc., Lockhart, TX (US)

( * ) Notice: Subject to any disclaimer, the term of this patent is extended or adjusted under 35 U.S.C. 154(b) by 0 days.

(21) Appl. No.: 16/562,096

(22) Filed: Sep. 5, 2019

(65) Prior Publication Data

US 2021/0069667 A1    Mar. 11, 2021

(51) Int. Cl.
*B01J 19/24*     (2006.01)
*B01J 14/00*     (2006.01)
*B01D 11/04*     (2006.01)

(52) U.S. Cl.
CPC ....... *B01J 19/2415* (2013.01); *B01D 11/0449* (2013.01); *B01J 14/00* (2013.01); *B01J 2219/02* (2013.01)

(58) Field of Classification Search
CPC .. A61L 9/122; A61L 2209/11; A61L 2209/12; A61L 2209/133; A61L 2209/134; A61L 9/12
USPC ................................................ 422/124, 129
See application file for complete search history.

(56) References Cited

U.S. PATENT DOCUMENTS

| | | |
|---|---|---|
| 3,754,377 A | 8/1973 | Clonts |
| 3,758,404 A | 9/1973 | Clonts |
| 3,839,487 A | 10/1974 | Clonts |
| 3,977,829 A | 8/1976 | Clonts |
| 3,989,466 A | 11/1976 | Pan |
| 3,992,156 A | 11/1976 | Clonts |
| 4,491,565 A | 1/1985 | Verachtert |
| 4,551,252 A | 11/1985 | Boyadjiev |
| 4,753,722 A | 6/1988 | Le et al. |
| 5,354,482 A | 10/1994 | Varadi |
| 5,395,517 A | 3/1995 | Varadi |
| 5,904,849 A | 5/1999 | Kim et al. |
| 5,961,819 A | 10/1999 | Lee et al. |
| 5,997,731 A | 12/1999 | Suarez |
| 2006/0231490 A1 | 10/2006 | Manna et al. |
| 2019/0247769 A1* | 8/2019 | Massingill ............. B01D 15/14 |

FOREIGN PATENT DOCUMENTS

| | | |
|---|---|---|
| CN | 105885937 | 8/2016 |
| CN | 205676427 | 11/2016 |
| CN | 107043636 | 8/2017 |
| CN | 207143179 | 3/2018 |
| CN | 108410501 | 8/2018 |
| EP | 0203574 | 12/1986 |
| WO | WO 85/04894 | 11/1985 |
| WO | WO 94/08708 | 4/1994 |
| WO | WO 98/22395 | 5/1998 |
| WO | WO 2005/056727 | 6/2005 |
| WO | WO 2005/056728 | 6/2005 |
| WO | WO 2006/083427 | 8/2006 |
| WO | WO 2008/156537 | 12/2008 |
| WO | WO 2009/035480 | 3/2009 |
| WO | WO 2011/044552 | 4/2011 |
| WO | WO 2011/066523 | 6/2011 |
| WO | WO 2012/018657 | 2/2012 |
| WO | WO 2012/030880 | 3/2012 |
| WO | WO 2012/066572 | 5/2012 |
| WO | WO 2012/067988 | 5/2012 |
| WO | WO 2012/106290 | 8/2012 |
| WO | WO 2013/131094 | 9/2013 |
| WO | WO 2013/177057 | 11/2013 |
| WO | WO 2013/177261 | 11/2013 |
| WO | WO 2014/011574 | 1/2014 |
| WO | WO 2014/039350 | 3/2014 |
| WO | WO 2014/047195 | 3/2014 |
| WO | WO 2014/085559 | 6/2014 |
| WO | WO 2014/100454 | 6/2014 |
| WO | WO 2017/222 830 | 12/2017 |

OTHER PUBLICATIONS

Schmetzneddles.com (Year: 2019).*
Service Thread "How to estimate a Yarn or Thread size using diameter" (Year: 2021).*
Minglong "what is proper meaning of 40s/2 and Tex29.5 pf a sewing thread?" (Year: 2021).*
Merichem, "Fiber Film Non-dispersive Hydrocarbon Treating", not dated.
Gupta, Yash et al., "Fibre Film Contactors", Indian Chemical Engineer, 2012.
Zhang, F. et al., "Removal of organosulfurs from liquefied petroleum gas in a fiber film contactor using a new formulated solvent", Fuel Processing Technology, 2015.

* cited by examiner

*Primary Examiner* — Huy Tram Nguyen
(74) *Attorney, Agent, or Firm* — Haynes and Boone, LLP

(57) ABSTRACT

A conduit contactor for conducting chemical reactions or chemical extractions between immiscible liquids includes a conduit having a hollow interior, a first open end, and a second open end opposite the first open end; a separator in fluid communication with and proximate the second open end; and a plurality of fibers disposed within the conduit. A total surface area of the fibers per volume of the hollow interior of the conduit is from 100 $cm^2/cm^3$ to 490 $cm^2/cm^3$.

20 Claims, 1 Drawing Sheet

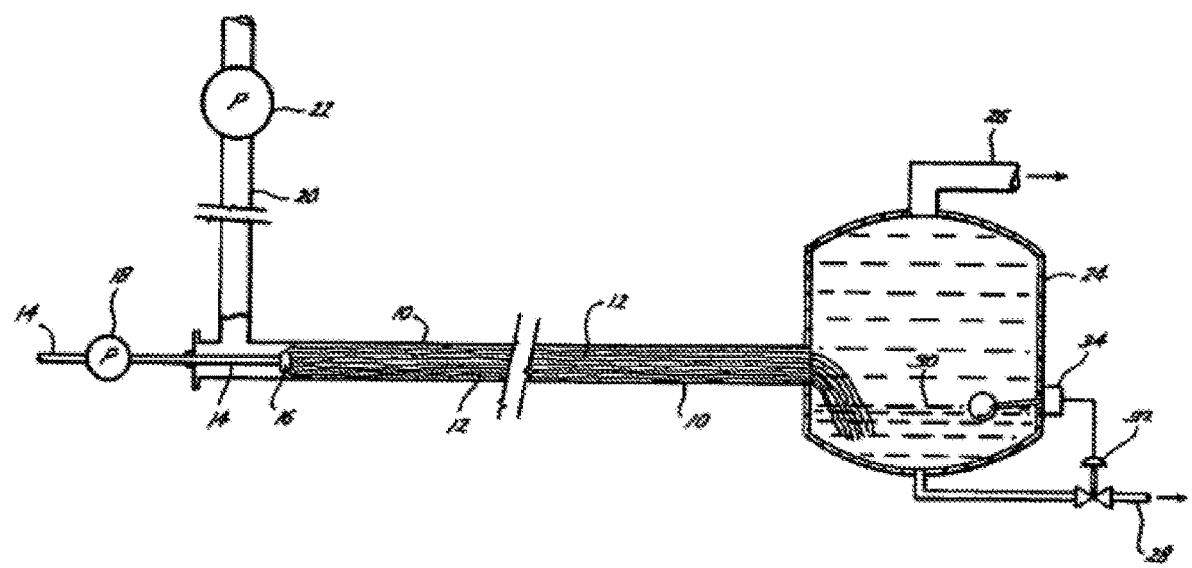

CONDUIT CONTACTOR AND METHOD OF USING THE SAME

TECHNICAL FIELD OF THE DISCLOSURE

The present disclosure generally relates to a conduit contactor for facilitating chemical reactions and/or chemical extractions between immiscible liquids.

BACKGROUND OF THE DISCLOSURE

One method of reacting immiscible liquids, e.g., an aqueous phase and an organic phase, includes creating dispersions of one phase in the other to generate small droplets with a large surface area where mass transfer and reaction can occur. After mixing the reactants, separation of the phases is needed for product purity and quality. However, when using dispersion methods, separation of phases can be difficult and time consuming.

Alternative methods have been employed using fiber reactors or conduit contactors, in which fibers or films disposed within a conduit provide increased surface area to facilitate reaction between the immiscible liquids while avoiding agitation of the immiscible liquids and the resultant forming of dispersions/emulsions that are difficult to separate. Examples of conduit contactors are described in U.S. Pat. Nos. 7,618,544 and 8,128,825, both of which are incorporated herein in their entireties.

However, conduit contactors are generally expensive to build and maintain, wherein a large portion of this cost is associated with the fibers or films used to create increased surface area for mass transfer or reaction. As such, there remains a need for an efficient and cost-effective conduit contactor.

BRIEF SUMMARY OF THE DISCLOSURE

According to embodiments of the present disclosure, a conduit contactor is provided having improved efficiency and decreased cost of production. Traditionally, it was thought that maximizing surface area of fiber material within the conduit contactor could achieve more complete reaction between the immiscible liquids. However, the present inventors have surprisingly found that by reducing the amount of fiber material within the conduit contactor to a certain degree, the conduit contactor is able to more efficiently facilitate chemical extractions and/or chemical reactions between immiscible liquids introduced into the conduit contactor.

The utilization of this discovery provides an enormous benefit in terms of cost of constructing and maintaining such conduit contactors because the fiber material used therein can account for upwards of half of the total construction cost. Moreover, the reduction in fiber material within the conduit contactor allows for greater throughput or flow rates of the reactant liquids.

BRIEF DESCRIPTION OF THE DRAWING

The following FIGURE illustrate embodiments of the subject matter disclosed herein. The claimed subject matter may be understood by reference to the following description taken in conjunction with the accompanying FIGURE, in which:

FIG. 1 illustrates an example of a conduit contactor useful for the processes described herein.

DETAILED DESCRIPTION

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, a conduit contactor may include a conduit 10 having a bundle of elongated fibers 12 within the conduit 10 for a portion of its length. Fibers 12 are secured to tube 14 at node 15. Tube 14 extends beyond one end of conduit 10 and is operatively associated with metering pump 18 which pumps a first (constrained) phase liquid through tube 14 and onto fibers 12. Operatively connected to conduit 10 upstream of node 15 is inlet pipe 20 which is operatively associated with metering pump 22. This pump 22 supplies a second (continuous) phase liquid through inlet pipe 20 and into conduit 10, where it is squeezed between the constrained coated fibers 12. At the downstream end of conduit 10 is a gravity separator or settling tank 24 into which the downstream end of fibers 12 may extend. Operatively associated with an upper portion of gravity separator 24 is outlet line 26 for outlet of one of the liquids, and operatively associated with a lower portion of gravity separator 24 is outlet line 28 for outlet of the other liquid, with the level of interface 30 existing between the two liquids being controlled by valve 32, operatively associated with outlet line 28 and adapted to act in response to a liquid level controller indicated generally by numeral 34.

Although the conduit contactor shown in FIG. 1 is arranged such that fluid flow traverses in a horizontal manner, the arrangement of the conduit contactor is not so limited. In some cases, the conduit contactor may be arranged such that inlet pipes 14 and 20 as well as node 15 occupy an upper portion of the apparatus and settling tank 24 occupies the bottom portion of the apparatus. For example, the conduit contactor shown in FIG. 1 may be rotated approximately 90° in parallel with the plane of the paper to arrange inlet pipes 14 and 20, node 15 and settling tank 24 in the noted upper and lower positions. Such an arrangement may capitalize on gravity forces to aid in propelling fluid through the contactor. In yet other embodiments, the conduit contactor depicted in FIG. 1 may be rotated approximately 90° in the opposite direction parallel with the plane of the paper such that inlet pipes 14 and 20 and node 15 occupies the bottom portion of the apparatus and settling tank 24 occupies the upper portion of the apparatus. In such cases, the hydrophilicity, surface tension, and repulsion of the continuous phase fluid will keep the constrained phase fluid constrained to the fibers regardless of whether the fluids are flowing up, down, or sideways and, thus, sufficient contact can be attained to affect the desired reaction and/or extraction without the need to counter gravity forces. It is noted that such an inverted arrangement of a conduit contactor is applicable for any of the extraction processes described herein as well as any other type of fluid contact process that may be performed in a conduit contactor. It is further noted that conduit contactors may be arranged in a slanted position for any of the extraction processes described herein or for any other process that may be performed in a conduit contactor (i.e., the sidewalls of the conduit contactor may be arranged at any angle between 0° and 90° relative to a floor of a room in which the conduit contactor is arranged).

According to the method of the present disclosure, a first extractant or reactant liquid can be introduced through tube 14 and onto fibers 12. A second liquid that is immiscible with the first liquid can be introduced into conduit 10 through inlet pipe 20 and through spaces, or void spaces, between fibers 12. Fibers 12 will be wetted by the first liquid preferentially to the second liquid. The first liquid will form a film on fibers 12, and the second liquid will flow therethrough. Due to the relative movement of the second liquid with respect to the first liquid on fibers 12, a new interfacial boundary between the second liquid and the first liquid is continuously being formed, and as a result, fresh liquid is brought in contact with the extractant, thus causing and accelerating the extraction. Not being bound by theory, it is believed that the first liquid forms a film on fibers 12 that is constrained to a greater extent than the second liquid, which facilitates the relative movement between the two liquids.

According to the method of the present disclosure, the first liquid is introduced into the conduit 10 at a first rate and the second liquid is introduced at a second rate. The first and second rates may be the same or different from each other and may be constant or variable. In one or more embodiments, a ratio of the first rate to the second rate is from 2:1 to 1:10, from 1:1 to 5:1, from 1:1 to 3:1, or from 5:3 to 2:1.

According to embodiments of the present disclosure, the fibers 12 are arranged within the conduit 10 such that a surface area density (SA density), measured in $cm^2/cm^3$, is from 100 to 490. The SA density represents the total surface area of the fibers 12 per cubic cm of volume within the conduit 10 at a location within the conduit 10 containing fibers 12. As referred to herein, the surface area of the fibers 12 is calculated based on the average fiber diameters without accounting for any surface features of the fibers 12 (e.g., pores within a porous fiber). As a non-limiting example, for fibers with substantially the same diameter and generally extending linearly from the inlet to the outlet of a conduit, such as conduit 10, the SA density may be determined by taking a midsection of predetermined length of the conduit (e.g., a length equal to 1 divided by the cross-sectional interior area of the conduit, such that the volume of said midsection is equal to 1 $cm^3$), calculating the surface area of a single fiber over said length and multiplying by total number of fibers in the conduit to reach a total surface area of the fibers, and then dividing said total surface area by the volume of the conduit over said length. As another example, the predetermined length could be set to the length of the fibers within the conduit (i.e., not including fiber length extending outside of the conduit). This concept can be applied in a straightforward manner to fibers having varying diameters by, e.g., separating the calculation of fiber surface area based on the number of fibers of each diameter.

According to some embodiments, the SA density may be at least 100, at least 105, at least 110, at least 115, at least 120, at least 125, at least 130, at least 135, at least 140, at least 145, at least 150, at least 155, at least 160, at least 165, at least 170, at least 175, at least 180, or at least 185, at least 190, at least 195, at least 200, at least 205, at least 210, at least 215, at least 220, at least 225, at least 230, at least 235, at least 240, or at least 245. According to some embodiments, the SA density may be at most 490, at most 485, at most 480, at most 475, at most 470, at most 465, at most 460, at most 455, at most 450, at most 445, at most 440, at most 435, at most 430, at most 425, at most 420, at most 415, at most 410, at most 405, at most 400, at most 395, at most 390, at most 385, at most 380, or at most 375. According to some embodiments, the SA density may range between any of the foregoing lower and upper limits.

The fiber materials for the conduit contactor and processes described herein may be, but are not limited to, cotton, jute, silk, treated or untreated minerals, metals, metal alloys, treated and untreated carbon allotropes, polymers, polymer blends, polymer composites, nanoparticle reinforced polymer, combinations thereof, and coated fibers thereof for corrosion resistance or chemical activity. In general, the fiber type is selected to match the desired constrained phase. For example, organophilic fibers may be used with a constrained phase that is substantially organic. This arrangement can, for example, be used to extract organic materials from water with organic liquids constrained to the fibers. Suitable treated or untreated minerals include, but are not limited to, glass, alkali resistant glass, E-CR glass, quartz, ceramic, basalt, combinations thereof, and coated fibers thereof for corrosion resistance or chemical activity. Suitable metals include, but are not limited to, iron, steel, stainless steel, nickel, copper, brass, lead, thallium, bismuth, indium, tin, zinc, cobalt, titanium, tungsten, nichrome, zirconium, chromium, vanadium, manganese, molybdenum, cadmium, tantalum, aluminum, anodized aluminum, magnesium, silver, gold, platinum, palladium, iridium, alloys thereof, and coated metals.

Suitable polymers include, but are not limited to, hydrophilic polymers, polar polymers, hydrophilic copolymers, polar copolymers, hydrophobic polymers/copolymers, non-polar polymers/copolymers, and combinations thereof, such as polysaccharides, polypeptides, polyacrylic acid, polyhydroxybutyrate, polymethacrylic acid, functionalized polystyrene (including but not limited to, sulfonated polystyrene and aminated polystyrene), nylon, polybenzimidazole, polyvinylidenedinitrile, polyvinylidene chloride and fluoride, polyphenylene sulfide, polyphenylene sulfone, polyethersulfone, polymelamine, polyvinyl chloride, polyvinyl acetate, polyvinyl alcohol, co-polyethylene-acrylic acid, polyethylene terephthalate, ethylene-vinyl alcohol copolymers, polyethylene, polychloroethylene, polypropylene, polybutadiene, polystyrene, polyphenol-formaldehyde, polyurea-formaldehyde, polynovolac, polycarbonate, polynorbornene, polyfluoroethylene, polyfluorochloroethylene, polyepoxy, polyepoxyvinylester, polyepoxynovolacvinylester, polyimide, polycyanurates, silicone, liquid crystal polymers, derivatives, composites, nanoparticle reinforced, and the like.

In some cases, fibers can be treated for wetting with preferred phases, to protect from corrosion by the process streams, and/or coated with a functional polymer. For instance, carbon fibers can be oxidized to improve wettability in aqueous streams and polymer fibers can display improved wettability in aqueous streams and/or be protected from corrosion by incorporation of sufficient functionality into the polymer, including but not limited to, hydroxyl, amino, acid, base, enzyme, or ether functionalities. In some cases, the fibers may include a chemical bound (i.e., immobilized) thereon to offer such functionalities. In some embodiments, the fibers may be ion exchange resins, including those suitable for hydroxyl, amino, acid, base or ether functionalities. In other cases, glass and other fibers can be coated with acid, base, or ionic liquid functional polymer. As an example, carbon or cotton fibers coated with an acid resistant polymer may be applicable for processing strong acid solutions. In some cases, fibers may include materials that are catalytic or extractive for particular processes. In some cases, the enzymatic groups may comprise the fibers to aid in particular reactions and/or extractions.

In some embodiments, all the fibers within a conduit contactor may be of the same material (i.e., have same core material and, if applicable, the same coating). In other cases, the fibers within a conduit contactor may include different types of materials. For example, a conduit contactor may include a set of polar fibers and a set of non-polar fibers. Other sets of varying materials for fibers may be considered. As noted above, the configuration of fibers (e.g., shape, size, number of filaments comprising a fiber, symmetry, asymmetry, etc.) within a conduit contactor may be the same or different for the processes described herein. Such variability in configuration may be in addition or alternative to a variation of materials among the fibers. In some embodiments, different types of fibers (i.e., fibers of different configurations and/or materials) may run side by side within a contactor with each set having their own respective inlet and/or outlet. In other cases, the different types of fibers may extend between the same inlet and outlet. In either embodiment the different types of fibers may be individually dispersed in the conduit contactor or, alternatively, each of the different fiber types may be arranged together. In any case, the use of different types of fibers may facilitate multiple separations, extractions, and/or reactions to be performed simultaneously in a conduit contactor from a singular or even a plurality of continuous phase streams. For example, in a case in which a conduit contactor is filled with multiple bundles of respectively different fiber types each connected to its own constrained phase fluid inlet and arranged off-angle, the bundles could be arranged for the continuous phase fluid to pass sequentially over the multiple fiber bundles with different materials extracted by or from each bundle. The fiber diameter is not particularly limited and may be, e.g., 5 to 150 μm, 10 to 100 μm, 12 to 75 μm, 15 to 60 μm, 17 to 50 μm, 20 to 45 μm, 20 to 35 μm, or 20 to 25 μm. The length of the conduit contactor is not particularly limited and may be, e.g., 0.25 to 10 m, 0.5 to 5 m, 0.75 to 3 m, 1 to 2.5, or 1.5 to 2 m. The diameter or width of the conduit contactor is likewise not particularly limited and may be, e.g., 0.5 cm to 3 m, 5 cm to 2.5 m, 10 cm to 2 m, 15 cm to 1.5 m, 20 cm to 1 m, 25 to 75 cm, 30 to 70 cm, 35 to 65 cm, 40 to 60 cm, 45 to 55 cm, or 50 cm.

Examples of a chemical reaction which could be achieved using the conduit contactor and methods of the present disclosure include, but are not limited to: an epichlorohydrin reaction; O-alkylation (etherification); N-alkylation; C-alkylation; chiral alkylation; S-alkylation; esterification; transesterification; displacement (e.g., with cyanide, hydroxide, fluoride, thiocyanate, cyanate, iodide, sulfide, sulfite, azide, nitrite, or nitrate); other nucleophilic aliphatic & aromatic substitutions; oxidation; hydrolysis; epoxidation and chiral epoxidation; Michael addition; aldol condensation; Wittig condensation; Darzens Condensation; carbene reactions; thiophosphorylation; reduction; carbonylation; transition metal co-catalysis; HCl/HBr/HOCl/H2SO4 reactions; and polymer synthesis or polymer modification. In one or more embodiments, an organic halide (R—X) and an organic acid (R'—H) may be coupled by the process described herein to produce a coupled product (R—R'), wherein R—X and R'—H can be on the same molecule or different molecules. In such embodiments, the organic acid (R'H) may comprise a carbon acid, such as a cyclopentadiene, an acetoacetate, or an acetylene, or the organic acid may comprise carboxylic acids; thiocarboxylic acids; phenols, alcohols, thiols, amines, ethanolamines, and the like. In other embodiments, water, alcohols, carboxylic acids, inorganic acids, thiols, amines, or the like may be reacted with an epoxide to form a glycol or a substituted glycol such as, but not limited to, an alkyl ether alcohol, an alkyl thioether alcohol, an ester alcohol, and an amino alcohol, a phosphate ester or a borate ester.

In one or more embodiments, the conduit contactor may be heated or maintained at a temperature of, e.g., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., or greater than 100° C., or the temperature range between any of the foregoing values. In some embodiments, the conduit contactor temperature is limited to the boiling point of the reactants. However, operating the conduit contactor at pressure allows the use of reaction temperatures in excess of the boiling points of the reactants and allows reaction temperatures to exceed 100° C. The pressure within the conduit contactor is not particularly limited and may be, e.g., 5 to 75 psi, 10 to 60 psi, 15 to 40 psi, 20 to 30 psi, or 25 psi.

According to embodiments of the present disclosure, the cost of constructing and maintaining the conduit contactor may be reduced by use of less fiber material while facilitating more efficient chemical reactions and/or chemical extractions between immiscible liquids. Moreover, due to the reduction of fiber material within the conduit, throughput or flow rates of the immiscible liquids may be increased, further amplifying the efficiency of the conduit contactor.

EXAMPLES

Fibers were disposed within a conduit to provide the SA densities described in Table 1 below. A caustic solution (60/40 water ethanol with 2% NaOH) and an oil containing about 14% of free fatty acids (FFAs) were run through the fibers at rates of 75 ml/min and 125 ml/min, respectively. The oil and caustic phases were then collected and separated. The extraction rate shown in Table 1 represents the percentage of FFAs removed from the oil.

TABLE 1

| | SA density ($cm^2/cm^3$) | Extraction rate (%) |
|---|---|---|
| Comp. Ex. 1 | 62 | 24.96 |
| Ex. 1 | 124 | 66.70 |
| Ex. 2 | 186 | 66.89 |
| Ex. 3 | 248 | 69.05 |
| Ex. 4 | 310 | 71.89 |
| Ex. 5 | 372 | 79.73 |
| Ex. 6 | 434 | 63.23 |
| Comp. Ex. 2 | 496 | 57.38 |

As shown in Table 1 above, although Comparative Example 2 had a much higher SA density than Examples 1-6, the extraction rate of Comparative Example 2 was substantially inferior to those of Examples 1-6. Additionally, as shown in Comparative Example 1, when the SA density was below 100, the conversion rate deteriorated.

A conduit contactor for conducting chemical reactions or chemical extractions between immiscible liquids has been described herein. The conduit contactor includes a conduit having a hollow interior, a first open end, and a second open end opposite the first open end; a separator in fluid communication with and proximate the second open end; and a plurality of fibers disposed within the conduit. A total surface area of the fibers per volume of the hollow interior of the conduit is from 100 $cm^2/cm^3$ to 490 $cm^2/cm^3$.

The conduit contactor may include any combination of the following features:

A total surface area of the fibers per volume of the hollow interior of the conduit of from 125 $cm^2/cm^3$ to 450 $cm^2/cm^3$;

A total surface area of the fibers per volume of the hollow interior of the conduit of from 150 $cm^2/cm^3$ to 435 $cm^2/cm^3$;

A length of the conduit and the fibers of from 0.25 m to 10 m;

An average diameter of the hollow interior of the conduit of from 0.5 cm to 3 m; and/or An average diameter of the fibers of from 5 µm to 150 µm.

A method of conducting chemical reactions or chemical extractions between immiscible liquids has been described herein. The method includes providing a conduit contactor comprising: a conduit having a hollow interior, a first open end, and a second open end opposite the first open end; a separator in fluid communication with and proximate the second open end; and a plurality of fibers disposed within the conduit, wherein a total surface area of the fibers per volume of the hollow interior of the conduit is from 100 $cm^2/cm^3$ to 490 $cm^2/cm^3$; introducing a first liquid into the conduit and onto the fibers; introducing a second liquid into the conduit such that the second liquid contacts the first liquid, wherein the second liquid is immiscible with the first liquid; (i) extracting at least one component from the first liquid into the second liquid, (ii) extracting at least one component from the second liquid into the first liquid, or (iii) reacting at least one component from the first liquid with at least one component from the second liquid; and receiving the first and second liquids into the separator.

The method may include any combination of the following features:

A total surface area of the fibers per volume of the hollow interior of the conduit of from 125 $cm^2/cm^3$ to 450 $cm^2/cm^3$;

A total surface area of the fibers per volume of the hollow interior of the conduit of from 150 $cm^2/cm^3$ to 435 $cm^2/cm^3$;

A step of pre-heating the conduit contactor to a temperature of 15° C. to 100° C. prior to introducing the first liquid;

A length of the conduit and the fibers of from 0.25 m to 10 m;

An average diameter of the hollow interior of the conduit of from 0.5 cm to 3 m;

An average diameter of the fibers of from 5 µm to 150 µm;

A ratio of a first rate to a second rate of from 2:1 to 1:10, wherein the first liquid introduced at the first rate and the second liquid introduced at the second rate; and/or A ratio of the first rate to the second rate of from 1:1 to 3:1.

A system for facilitating chemical reactions or chemical extractions between immiscible liquids has been disclosed herein. The system includes a conduit having a hollow interior, a first open end, and a second open end opposite the first open end; a separator in fluid communication with and proximate the second open end; and a plurality of fibers disposed within the conduit, wherein a total surface area of the fibers per volume of the hollow interior of the conduit is from 100 $cm^2/cm^3$ to 490 $cm^2/cm^3$; a first fluid supply for introducing a first liquid into the conduit and onto the fibers; and a second fluid supply for introducing a second liquid into the conduit such that the second liquid contacts the first liquid; wherein the first liquid and the second liquid are immiscible.

The system may include any combination of the following features:

A total surface area of the fibers per volume of the hollow interior of the conduit of from 125 $cm^2/cm^3$ to 450 $cm^2/cm^3$;

A total surface area of the fibers per volume of the hollow interior of the conduit of from 150 $cm^2/cm^3$ to 435 $cm^2/cm^3$;

A ratio of a first rate to a second rate of from 2:1 to 1:10, wherein the first fluid supply is configured to introduce the first liquid into the conduit at the first rate and the second fluid supply is configured to introduce the second liquid into the conduit at the second rate; and/or A ratio of the first rate to the second rate of from 1:1 to 3:1.

It is understood that variations may be made in the foregoing without departing from the scope of the present disclosure. In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

What is claimed is:

1. A conduit contactor for conducting chemical reactions or chemical extractions between immiscible liquids comprising:
    a conduit having a hollow interior, a first open end, and a second open end opposite the first open end;
    a separator in fluid communication with and proximate the second open end; and
    a plurality of fibers disposed within the conduit,
    wherein a total surface area of the fibers per volume of the hollow interior of the conduit is 150 $cm^2/cm^3$ or greater.

2. The conduit contactor of claim 1, wherein a total surface area of the fibers per volume of the hollow interior of the conduit is from 180 $cm^2/cm^3$ to 490 $cm^2/cm^3$.

3. The conduit contactor of claim 1, wherein a total surface area of the fibers per volume of the hollow interior of the conduit is from 200 $cm^2/cm^3$ to 435 $cm^2/cm^3$.

4. The conduit contactor of claim 1, wherein a length of the conduit and the fibers is from 0.25 m to 10 m.

5. The conduit contactor of claim 1, wherein an average diameter of the hollow interior of the conduit is from 0.5 cm to 3 m.

6. The conduit contactor of claim 1, wherein an average diameter of the fibers is from 5 µm to 150 µm.

7. A method of conducting chemical reactions or chemical extractions between immiscible liquids comprising:
    providing a conduit contactor comprising:
        a conduit having a hollow interior, a first open end, and a second open end opposite the first open end;
        a separator in fluid communication with and proximate the second open end; and
        a plurality of fibers disposed within the conduit,
        wherein a total surface area of the fibers per volume of the hollow interior of the conduit is 150 $cm^2/cm^3$ or greater;
    introducing a first liquid into the conduit and onto the fibers;
    introducing a second liquid into the conduit such that the second liquid contacts the first liquid, wherein the second liquid is immiscible with the first liquid;

(i) extracting at least one component from the first liquid into the second liquid, (ii) extracting at least one component from the second liquid into the first liquid, or (iii) reacting at least one component from the first liquid with at least one component from the second liquid; and receiving the first and second liquids into the separator.

8. The method according to claim 7, wherein a total surface area of the fibers per volume of the hollow interior of the conduit is from 180 $cm^2/cm^3$ to 490 $cm^2/cm^3$.

9. The method according to claim 7, wherein a total surface area of the fibers per volume of the hollow interior of the conduit is from 200 $cm^2/cm^3$ to 435 $cm^2/cm^3$.

10. The method according to claim 7, further comprising pre-heating the conduit contactor to a temperature of 15° C. to 100° C. prior to introducing the first liquid.

11. The method according to claim 7, wherein a length of the conduit and the fibers is from 0.25 m to 10 m.

12. The method according to claim 7, wherein an average diameter of the hollow interior of the conduit is from 0.5 cm to 3 m.

13. The method according to claim 7, wherein an average diameter of the fibers is from 5 μm to 150 μm.

14. The method according to claim 7, wherein the first liquid is introduced at a first rate and the second liquid is introduced at a second rate, wherein a ratio of the first rate to the second rate is from 2:1 to 1:10.

15. The method according to claim 14, wherein the ratio of the first rate to the second rate is from 1:1 to 3:1.

16. A system for facilitating chemical reactions or chemical extractions between immiscible liquids comprising:

a conduit having a hollow interior, a first open end, and a second open end opposite the first open end;

a separator in fluid communication with and proximate the second open end; and a plurality of fibers disposed within the conduit,
wherein a total surface area of the fibers per volume of the hollow interior of the conduit is 150 $cm^2/cm^3$ or greater;

a first fluid supply for introducing a first liquid into the conduit and onto the fibers; and a second fluid supply for introducing a second liquid into the conduit such that the second liquid contacts the first liquid;
wherein the first liquid and the second liquid are immiscible.

17. The system according to claim 16, wherein a total surface area of the fibers per volume of the hollow interior of the conduit is from 180 $cm^2/cm^3$ to 490 $cm^2/cm^3$.

18. The system according to claim 16, wherein a total surface area of the fibers per volume of the hollow interior of the conduit is from 200 $cm^2/cm^3$ to 435 $cm^2/cm^3$.

19. The system according to claim 16, wherein the first fluid supply is configured to introduce the first liquid into the conduit at a first rate and the second fluid supply is configured to introduce the second liquid into the conduit at a second rate, wherein a ratio of the first rate to the second rate is from 2:1 to 1:10.

20. The system according to claim 19, wherein the ratio of the first rate to the second rate is from 1:1 to 3:1.

\* \* \* \* \*